(12) United States Patent
Hawksworth

(10) Patent No.: US 12,736,113 B2
(45) Date of Patent: Sep. 15, 2026

(54) DISPLACEMENT REDUCTION MECHANISM

(71) Applicant: Rohr, Inc., Chula Vista, CA (US)

(72) Inventor: Andrew Robert Hawksworth, Newport (GB)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 19/278,468

(22) Filed: Jul. 23, 2025

(65) Prior Publication Data

US 2026/0029043 A1 Jan. 29, 2026

(30) Foreign Application Priority Data

Jul. 23, 2024 (EP) .................................... 24190464

(51) Int. Cl.
*F16H 19/04* (2006.01)
*F16H 55/26* (2006.01)

(52) U.S. Cl.
CPC ............. *F16H 19/04* (2013.01); *F16H 55/26* (2013.01)

(58) Field of Classification Search
CPC ................................ F16H 19/04; F16H 55/26
See application file for complete search history.

(56) References Cited

U.S. PATENT DOCUMENTS 4,066,356 A * 1/1978 Parker .................... G03B 27/56 74/409
4,924,696 A 5/1990 Schroeder
6,340,135 B1 * 1/2002 Barton .................. B64D 29/00 244/54
6,920,803 B2 * 7/2005 Hasegawa ............. G02B 21/26 74/89.22
9,388,768 B2 * 7/2016 Lohman .................... F02K 1/72
2009/0031833 A1 2/2009 Wada

FOREIGN PATENT DOCUMENTS

CN 110360283 B 8/2024
GB 2183781 A 6/1987

* cited by examiner

*Primary Examiner* — Bobby Rushing, Jr.
(74) *Attorney, Agent, or Firm* — Getz Balich LLC

(57) ABSTRACT

A displacement reduction mechanism for coupling to a linear sensor, including a pinion, a first rack having a first plurality of teeth and a second rack having a second plurality of teeth is provided. The first and second racks are parallel to each other. The first plurality of teeth protrude from the first rack in the same direction in which the second plurality of teeth protrude from the second rack. The pinion is configured to be rotated over the first and second racks and to engage simultaneously with the first plurality of teeth and the second plurality of teeth. A number of teeth per unit length of the first rack is different from a number of teeth per unit length of the second rack. Rotation of the pinion over the first rack and the second rack causes the second rack to be displaced relative to the first rack.

15 Claims, 6 Drawing Sheets

DISPLACEMENT REDUCTION MECHANISM

This application claims priority to EP Patent Appln. No. 24190464.8 filed Jul. 23, 2024, which is hereby incorporated herein by reference in its entirety.

BACKGROUND OF THE DISCLOSURE

1. Technical Field

The present disclosure relates to a displacement reduction mechanism and to a system for monitoring the displacement of a linear actuator.

2. Background Information

Actuators are used in a variety of applications for moving components from one position to another. In particular, linear actuators are widely used in aircraft systems such as in thrust reverser systems.

Thrust reverser actuation systems (TRAS) provide a motive force to translate the moving sections of the nacelle, such as thrust reverser doors. TRAS typically include at least one actuator to deploy one or more thrust reverser doors from a stowed position to a deployed position. It may be important to monitor the position of the actuator during deployment, e.g. to help ensure that full thrust reversal is achieved. Incomplete deployment may result in inefficient thrust reversal, which may increase wheel brake wear and create safety and operational risks.

The present disclosure aims to provide a displacement reduction mechanism.

SUMMARY OF THE DISCLOSURE

According to the present disclosure, there is provided a displacement reduction mechanism for coupling to a linear sensor, the displacement reduction mechanism comprising: a pinion; a first rack comprising a first plurality of teeth; and a second rack comprising a second plurality of teeth; wherein the first rack and the second rack are parallel to each other; wherein a first direction in which the first plurality of teeth protrudes from the first rack is the same as a second direction in which the second plurality of teeth protrudes from the second rack; wherein the pinion is configured to be rotated over the first rack and the second rack such that the pinion engages simultaneously with the first plurality of teeth and the second plurality of teeth; wherein a number of teeth per unit length of the first rack is different from a number of teeth per unit length of the second rack; and wherein the pinion, the first rack and the second rack are arranged such that the rotation of the pinion over the first rack and the second rack causes the second rack to be displaced relative to the first rack.

The displacement reduction mechanism may be a linear displacement reduction mechanism. The displacement reduction mechanism may be arranged to convert an input displacement into an output displacement. The displacement reduction mechanism may be arranged to transmit the output displacement to the linear sensor, e.g. in order to measure and/or monitor the input displacement using the linear sensor.

When the input displacement is larger than the output displacement, the displacement reduction mechanism may be arranged to reduce the input displacement into the output displacement.

The (e.g. number of teeth of the) first and second racks may be arranged to provide the displacement reduction mechanism with a fixed reduction ratio, e.g. the input displacement may be (e.g. directly) proportional to the output displacement.

The displacement reduction mechanism may be physically coupled to the linear sensor via a mechanical linkage (e.g. a rod and/or lever arm), a mounting bracket or any other suitable coupling mechanism.

The pinion may comprise a series of evenly spaced pinion teeth that protrude radially outwards. The pinion teeth may be arranged in a parallel configuration around the circumference of the pinion.

The first rack and the second rack may each extend in a longitudinal direction of the displacement reduction mechanism. The first rack and the second rack may be parallel to each other in the longitudinal direction. The first rack and the second rack may be arranged side by side.

The first rack and the second rack may have the same length. The ends of the first rack and the second rack may be flush with each other.

The first rack and the second rack may have different lengths and a different number of teeth per unit length.

The first rack may be arranged to be a static rack which is configured to be stationary relative to a support structure or housing. The first rack may be fixed to the support structure or housing using any suitable fastening, locking, joining and/or welding means.

The second rack may be arranged to be a moving rack which is configured to be displaced (e.g. moved linearly) relative to the first rack and to the support structure or housing. The displacement reduction mechanism may include or be connected to guide rails and/or tracks which may be configured to support linear movement of the second rack. The guide rails and/or tracks may be a part of or adjoined to the support structure or housing.

The displacement reduction mechanism may be arranged such that the displacement (e.g. linear movement) of the second rack relative to the first rack is in the longitudinal direction.

The pinion may be configured to be displaced (e.g. moved linearly) relative to both the first rack and the second rack. The pinion may be configured to move relative to the support structure or housing.

The first plurality of teeth and the second plurality of teeth may each comprise a series of evenly spaced rack teeth which are arranged parallel to each other in the longitudinal direction across the first rack and the second rack respectively.

The first plurality of teeth and/or the second plurality of teeth may each extend along a partial length or a full length of the first rack and/or the second rack respectively.

The first plurality of teeth may protrude outwardly from one side of the first rack in a first direction which is perpendicular to the longitudinal direction. The second plurality of teeth may protrude outwardly from one side of the second rack in a second direction which is also perpendicular to the longitudinal direction. The first direction may be the same as the second direction.

When the first plurality of teeth extends over the same length of the first rack as the second plurality of teeth extends over the second rack, a first number of teeth of the first rack may be different to a second number of teeth of the second rack. The (e.g. number of teeth of the) first and second racks may be arranged such that the distance from one tooth to an adjacent tooth of the first rack is different to the second rack.

Providing a displacement reduction mechanism with a high displacement reduction ratio facilitates a small output displacement relative to the input displacement. This may reduce the space required to house the linear sensor and reduce volume constraints on the linear sensor itself.

Providing a linear displacement reduction mechanism to convert an input displacement into an output displacement allows for the displacement reduction mechanism to receive a linear input (e.g. from a linear actuator) and to transmit a linear output (e.g. to a linear sensor).

The linear configuration of the displacement reduction mechanism may facilitate ease of integration into the thrust reverser system, e.g. fitting into a complementarily shaped linear space and/or coupling with other linear components of the thrust reverser system.

In some examples, the pinion comprises an input shaft configured to be translated along the first rack and the second rack.

The pinion may define a central axis about which it is configured to be rotated. The central axis may be orthogonal to the longitudinal direction of the displacement reduction mechanism. The pinion and the input shaft may be configured to be coaxial about the central axis.

The pinion may comprise a central bore configured to receive the input shaft. The central bore may be located axially inwards of the pinion teeth.

The input shaft may be longer axially than the pinion, e.g. the input shaft may project axially beyond one or both faces of the pinion.

The pinion may be configured to be rotated about the input shaft, e.g. when the input shaft is translated along the first rack and the second rack.

In some examples, the input shaft may be distinct from but coupled to the pinion.

In some examples, each tooth of the pinion is configured to extend over and engage with a corresponding tooth of the first rack and a corresponding tooth of the second rack.

Each tooth of the pinion may comprise a pinion tooth flank which defines a (e.g. fixed) pinion tooth flank width extending from one face of the pinion to the other. The (e.g. fixed) pinion tooth flank width may be such that each of the pinion teeth are configured to extend over and engage with the first plurality of teeth and the second plurality of teeth simultaneously.

Each tooth of the first plurality of teeth and the second plurality of teeth may comprise a rack tooth flank, each rack tooth flank defining a (e.g. fixed) rack tooth flank width which extends perpendicularly to the longitudinal direction. The (e.g. fixed) rack tooth flank width may be constant for all teeth in the first plurality of teeth and/or the second plurality of teeth.

In some examples, the direction in which the second rack is displaced relative to the first rack is parallel to the direction in which the input shaft is translated.

The first rack may remain stationary relative to a support housing. The direction of displacement of the second rack and the direction in which the input shaft is translated may both be parallel to the longitudinal direction.

The direction in which the input shaft is translated may be the same direction as the direction of movement of the pinion.

In some examples, the number of teeth per unit length of the second rack is smaller than the number of teeth per unit length of the first rack.

The first plurality of teeth may comprise 102 teeth and the second plurality of teeth may comprise 100 teeth, such that the output displacement is fifty times less than the input displacement. The displacement reduction mechanism may be arranged to provide a displacement reduction ratio of the input displacement to the output displacement of 50:1.

The number of teeth per unit length of the second rack when compared to the number of teeth per unit length of the first rack may be configured (e.g. to be smaller than) such that the displacement of the second rack may be in an opposite direction to the direction of movement of the pinion.

The number of teeth per unit length of the second rack when compared to the number of teeth per unit length of the first rack may be configured (e.g. to be greater than) such that the displacement of the second rack may be in the same direction as the direction of movement of the pinion.

In some examples, the fraction of the number of teeth per unit length of the second rack over the number of teeth per unit length of the first rack is greater than or equal to 4/5, e.g. greater than or equal to 9/10, e.g. greater than or equal to 19/20, e.g. greater than or equal to 49/50.

The displacement reduction ratio of the input displacement to the output displacement may be greater than or equal to 5:1, e.g. greater than or equal to 10:1, greater than or equal to 20:1, greater than or equal to 50:1.

In some examples, the pinion is configured to be rotated reciprocally over the first rack and the second rack.

The input shaft of the pinion may be configured to be translated by an (e.g. linear) input such that it is displaced (e.g. moved linearly) reciprocally over the first rack and the second rack.

In some examples, the first plurality of teeth and the second plurality of teeth protrude outwardly from only one side of the first rack and only one side of the second rack respectively.

The first rack and/or the second rack may be configured such that there is a complete absence of teeth on the other side(s) of the first rack and/or the other side(s) of the second rack.

In some examples, each of the first plurality of teeth comprises a first tooth tip width, wherein the second plurality of teeth comprise teeth having a second tooth profile, wherein the second tooth profile comprises a second tooth tip width which is narrower than the first tooth tip width.

The second tooth tip width may be selected based on the fraction of the number of teeth per unit length of the second rack over the number of teeth per unit length of the first rack.

Providing a second tooth profile with a second tooth tip width which is narrower than the first tooth tip width may improve meshing of the pinion teeth with the second plurality of teeth.

In some examples, the pinion teeth may comprise a modified tooth root profile for engagement with the second tooth profile of the second plurality of teeth. The modified tooth root profile may have a reduced tooth root width, e.g. by introducing or increasing the undercut of each pinion tooth.

Providing a modified tooth root profile of the pinion teeth may create more clearance for improved meshing of the pinion teeth with the second plurality of teeth. Interference between the pinion teeth and the second plurality of teeth may be minimised or eliminated. Stress concentration may be reduced by distributing the forces acting on each pinion teeth more evenly.

According to the present disclosure, there is also provided a system for monitoring the displacement of a linear actuator, the system comprising: the displacement reduction mechanism as described in any of the above examples; a linear sensor; an input actuator for translating the pinion across the first rack and the second rack; wherein the pinion is configured to be coupled (e.g. connected) to the input actuator; wherein the second rack is configured to be coupled (e.g. connected) to the linear sensor.

The linear actuator may be a thrust reverser actuator. The thrust reverser actuator may be configured to move between a stow stroke and a deploy stroke.

The system may be configured such that the input displacement corresponds to the travel distance (i.e. stroke) of the thrust reverser actuator. The system may be configured such that the input displacement may be equal in magnitude to or (e.g. directly) proportional to the travel distance (i.e. stroke) of the thrust reverser actuator. The thrust reverser actuator may have a fully retracted (e.g. stowed) position and a fully extended (e.g. deployed) position.

The linear sensor may be arranged to receive the reduced output displacement from the displacement reduction mechanism. The output displacement of the displacement reduction mechanism may be equal to the linear displacement of the core along the axis of the linear sensor.

The (e.g. axis of the) linear sensor may extend parallel to the longitudinal direction of the displacement reduction mechanism. The linear sensor may extend perpendicular to the central axis of the pinion.

The linear sensor may be configured to measure the linear displacement of the thrust reverser actuator. The linear sensor may be configured to monitor the position of the thrust reverser actuator relative to a fixed point (e.g. the stroke of the thrust reverser actuator). The linear sensor may be configured to monitor the deployment status of the thrust reverser actuator. This may provide for more precise and real-time position measurements of a thrust reverser door (or a thrust reverser blocker).

The input actuator may comprise a (e.g. linear) motor. The motor may provide an input to the displacement reduction mechanism in the longitudinal direction.

The pinion may be configured to be coupled or connected to the input actuator via the input shaft.

In some examples, the input actuator is arranged to be (e.g. directly) coupled to a thrust reverser actuator.

The input actuator may be physically coupled to the thrust reverser actuator via a mechanical linkage (e.g. a rod and/or lever arm), a mounting bracket or any other suitable coupling mechanism.

In some examples, the pinion is configured to be coupled or connected to the input actuator via a linear mechanical input.

The input shaft may be configured to be coupled to and translated by the (e.g. linear) mechanical input. The (e.g. linear) mechanical input may be coupled to the input actuator. The input actuator may be configured to transmit rotational motion to the pinion, e.g. via the (e.g. linear) mechanical input.

For example, the (e.g. linear) mechanical input may be a (e.g. ball) nut. The (e.g. ball) nut may be configured to be coupled to a (e.g. ball) screw shaft, and further configured to translate linearly (e.g. in the longitudinal direction) along the (e.g. ball) screw shaft when (e.g. ball) screw shaft is rotated. The (e.g. linear) mechanical input may be configured to translate the rotational motion of the input actuator into linear motion of the input shaft, and thus rotational motion of the pinion.

The (e.g. ball) screw may arranged to be stationary relative to the displacement reduction mechanism and/or the support structure or housing.

The (e.g. ball) screw shaft may extend in the longitudinal direction of the displacement reduction mechanism. The (e.g. ball) screw shaft may comprise a screw thread having helical grooves which extend along the (e.g. ball) screw shaft.

The (e.g. ball) nut may comprise a central internal cavity which may be configured to receive the (e.g. ball) screw shaft. The central internal cavity may have a screw thread with complementary helical grooves to provide coupling to the (e.g. ball) screw shaft.

The (e.g. ball) nut may be configured to translate reciprocally in the longitudinal direction. The second rack may be configured to be displaced reciprocally in the longitudinal direction as the pinion is translated over the first rack and the second rack.

The system may be configured such that the magnitude of displacement of the moving rack relative to the static rack is (e.g. directly) proportional to the magnitude of displacement of the ball nut over the ball screw shaft. The system may be configured such that the displacement of the thrust reverser actuator is equal to the displacement of the ball nut over the ball screw shaft.

The system may be configured such that the magnitude of displacement of the moving rack relative to the static rack is one fiftieth of the magnitude of displacement of the ball nut over the ball screw shaft.

For example, the (e.g. linear) mechanical input may be a hydraulic piston.

In some examples, the linear sensor is configured to be communicatively coupled with an aircraft control system, wherein the linear sensor is further configured to transmit a signal representative of the linear displacement to the aircraft control system.

The aircraft control system may be configured to initiate acceleration of the aircraft engine (e.g. from an idle or low speed to maximum speed) upon receiving the signal from the linear sensor. The linear sensor may therefore be configured to provide a closed loop feedback control to the thrust reverser actuation system.

The sensor may be configured to communicate the linear displacement and/or position measurements to an aircraft control system or a human operator such as an aircraft pilot, thus enabling adjustments to be made to ensure proper actuation of the thrust reverser doors is achieved. Full thrust reversal may therefore be ensured before the aircraft engines are accelerated.

In some examples, the system further comprises a spring connected between the second rack and the linear sensor.

The spring may be configured to provide a constant force to the second rack. This may reduce or eliminate backlash by keeping the pinion teeth and the second plurality of teeth in contact with each other.

The spring may comprise any biasing member for mechanism suitable for biasing the second rack in the longitudinal direction (e.g. towards the linear sensor). The spring may be made of spring steel, metal allow or any other suitable material.

In some examples, the linear sensor comprises a linear variable different transformer.

The linear sensor may be any other suitable type of linear sensor, such as a potentiometric (position) sensor, a magnetostrictive sensor, a linear capacitive sensor, a linear optical sensor or a linear (e.g. optical) encoder.

The LVDT may comprise a primary coil and two secondary coils wound around a core. The displacement reduction mechanism may be configured to be physically coupled to an LVDT by connecting the second rack to the core of the LVDT.

Using an LVDT as the linear sensor may provide highly accurate measurements which are reliable even when the LVDT is exposed to vibrations and extreme temperatures.

Features of any aspect or example described herein may, wherever appropriate, be applied to any other aspect or example described herein. Where reference is made to different examples or sets of examples, it should be understood that these are not necessarily distinct but may overlap.

BRIEF DESCRIPTION OF THE DRAWINGS

One or more non-limiting examples will now be described, by way of example only, and with reference to the accompanying figures in which.

DETAILED DESCRIPTION

The examples described herein are used for linear motion sensing devices in aircraft, particularly in aircraft thrust reverser actuators. However, other applications are also envisaged and the examples are not limited to this use.

Figure 1A:
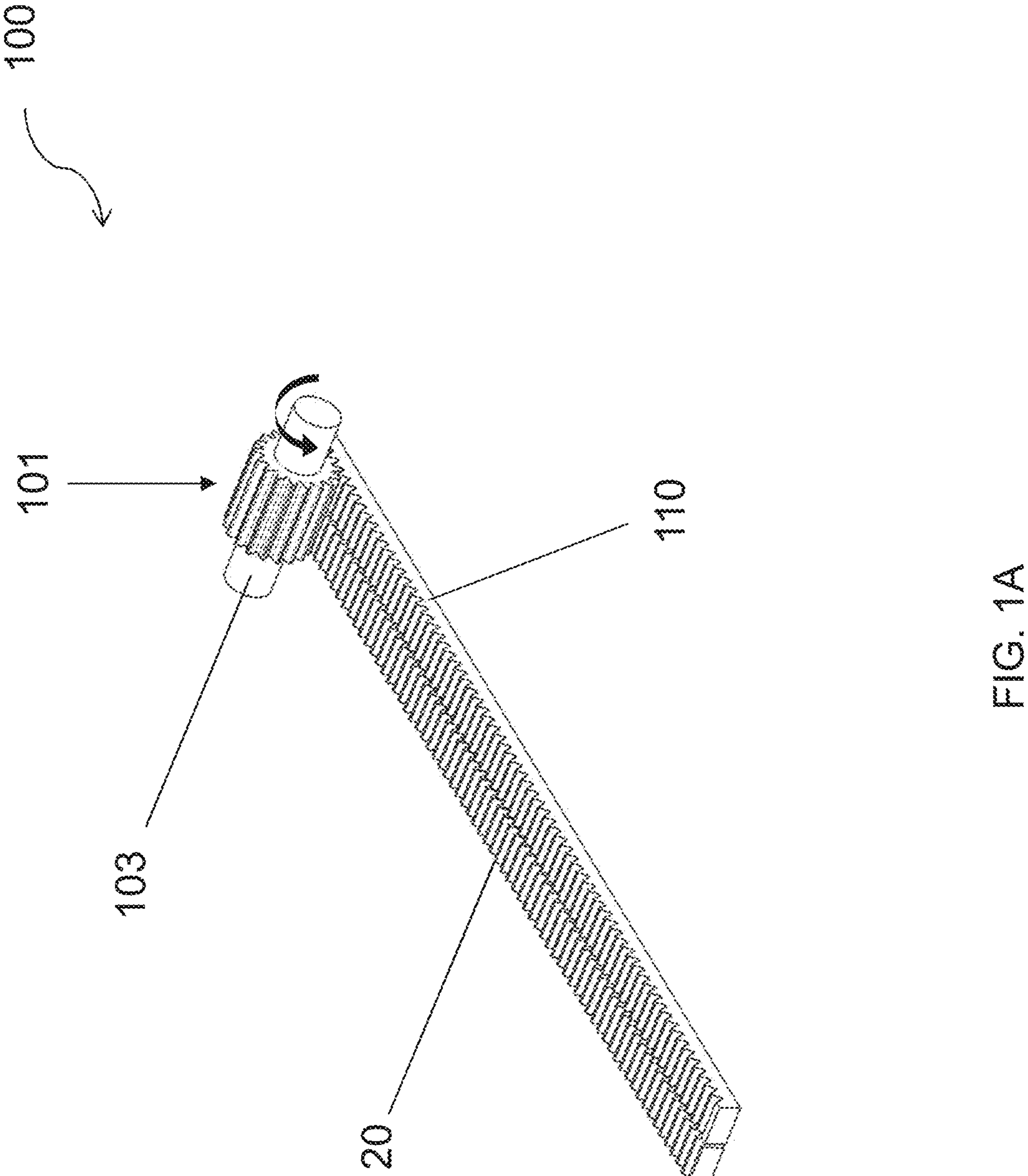
FIG. 1A shows a perspective view of a displacement reduction mechanism prior to rotating a pinion over a first rack and a second rack.
Figure 1B:
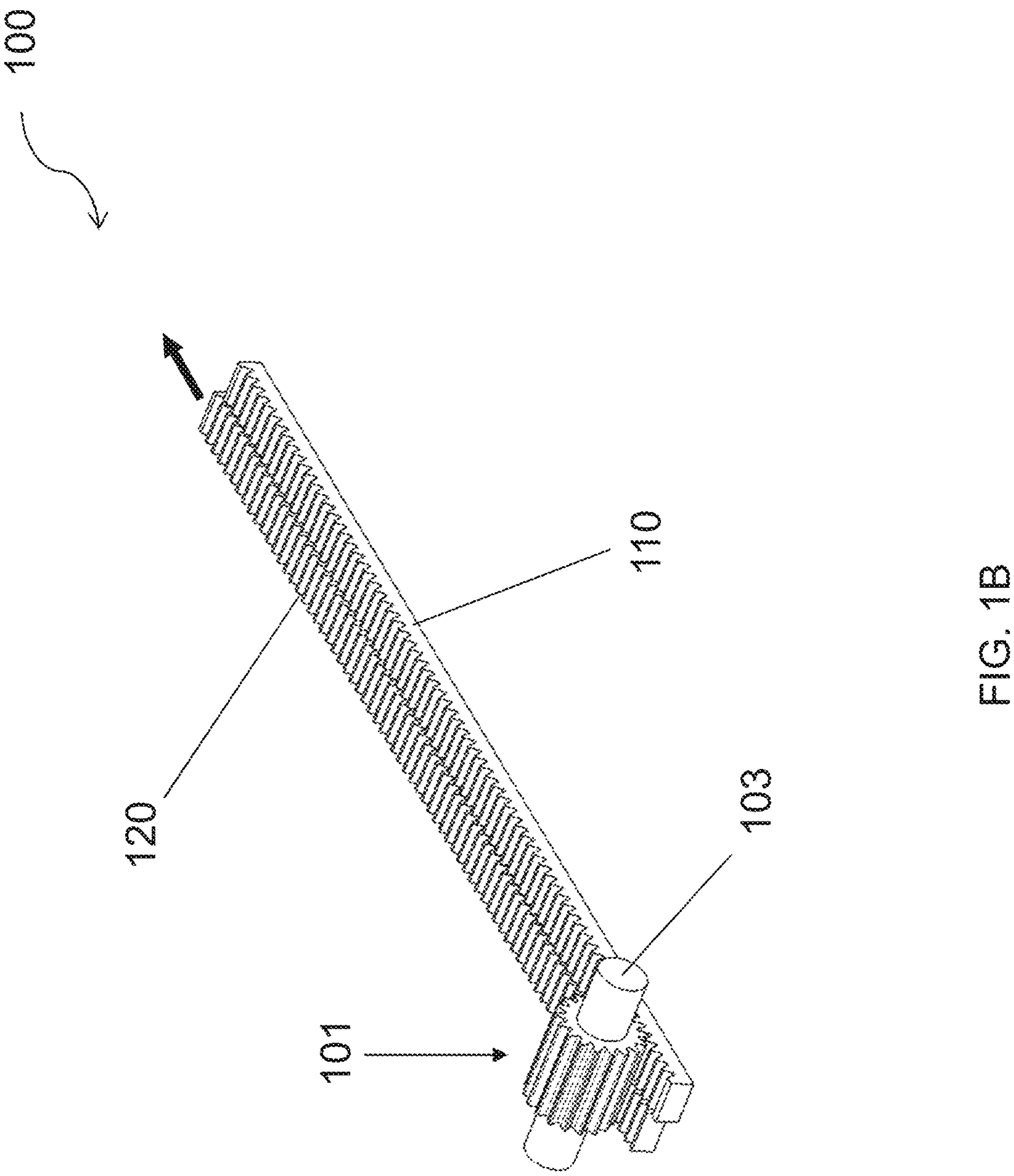
FIG. 1B shows a perspective view of a displacement reduction mechanism after rotating a pinion over a first rack and a second rack.
Figure 1C:
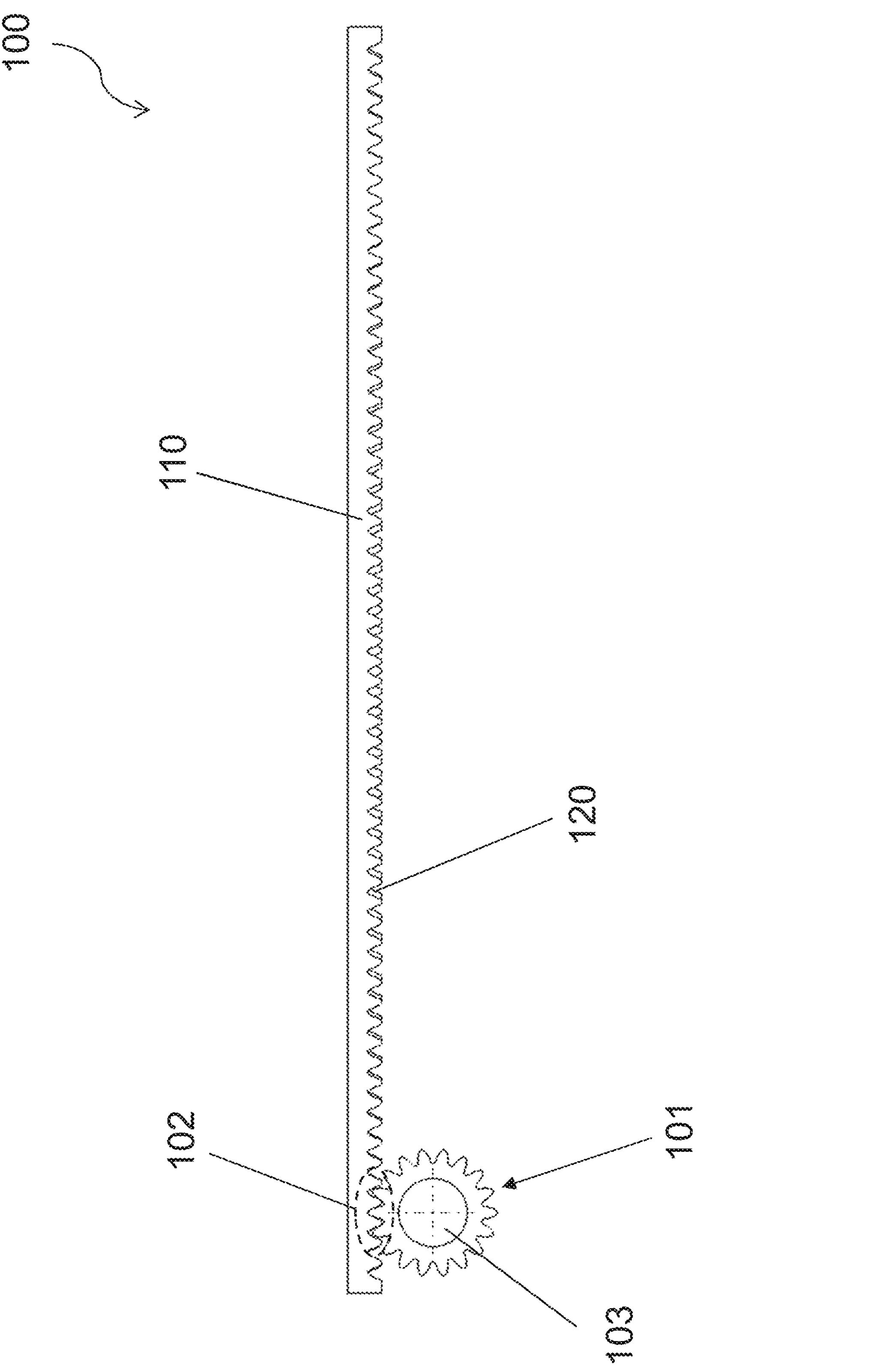
FIG. 1C shows a side elevation view of a displacement reduction mechanism.

FIGS. 1A-C show a displacement reduction mechanism 100 for coupling to a linear sensor. The displacement reduction mechanism 100 is used to proportionally reduce a linear displacement such as a stroke length of a thrust reverser actuator. This allows a reduced displacement to be transmitted to the linear sensor in order to monitor the position of the thrust reverser.

The displacement reduction mechanism 100 comprises at least a pinion 101, a static rack 110 and a moving rack 120.

The pinion 101 is a cylindrical gear which defines a central axis about which the pinion 101 is configured to be rotated. The pinion 101 is configured to be coupled to an input shaft 103 which is coaxial with the pinion 101. The pinion 101 is configured to be rotated about the input shaft 103. The pinion 101 has a central bore located axially inwards of the pinion teeth, which is configured to receive the input shaft 103.

The pinion 101 comprises a series of evenly spaced pinion teeth that protrude radially outwards and are arranged in a parallel configuration around the circumference of the pinion. Flanks of each pinion tooth extend in a direction parallel to the central axis, and the flanks define a constant pinion flank width extending from one face of the pinion to the other.

The input shaft 103 extends coaxially through the central bore of the pinion. The input shaft 103 is longer axially than the pinion 101, such that the input shaft 103 projects axially beyond both faces of the pinion.

The static rack 110 and the moving rack 120 extend in a longitudinal direction of the displacement reduction mechanism 100. The static rack 110 and the moving rack 120 are parallel to each other in the longitudinal direction. The longitudinal direction is perpendicular to the central axis.

Each rack comprises a series of evenly spaced rack teeth that protrude in a parallel configuration along the length of the rack. The flanks of each rack tooth extend perpendicularly to the longitudinal direction and parallel to the central axis.

The static rack 110 is fixed in place (e.g. to a support housing), whilst the moving rack 120 is arranged to move reciprocally in the longitudinal direction.

FIG. 1A shows the displacement reduction mechanism 100 prior to the rotation of the pinion 101 over the static rack 110 and the moving rack 120.

The static rack 110 and the moving rack 120 are the same length and are arranged side by side. The static rack 110 and the moving rack 120 are aligned such that their ends are flush with each other.

The pinion flank width of each pinion tooth is such that each of the pinion teeth are arranged to extend over and engage with the teeth of the static rack and the teeth of the moving rack simultaneously. The pinion 101 is able to be rotated simultaneously over both the static rack 110 and the moving rack 120. For each tooth of the static rack 110 with which the pinion 101 engages, the pinion 101 correspondingly engages with a tooth of the moving rack 120.

The static rack 110 has a first number of teeth, and the moving rack 120 has a second number of teeth. Both the first number of teeth and the second number of teeth are evenly spaced over the lengths of the static rack 110 and the moving rack 120 respectively. The first number of teeth is greater than the second number of teeth. For example, the first number of teeth may be hundred and two, whilst the second number of teeth may be a hundred.

Since both the static rack 110 and the moving rack 120 have the same length but differ in the number of evenly spaced teeth, the number of teeth per unit length of the static rack n1 differs from the number of teeth per unit length of the moving rack n2. The spacing between adjacent teeth measured in the longitudinal direction may define a linear pitch of each rack.

FIG. 1B shows the displacement reduction mechanism 100 after rotation of the pinion 101 over the static rack 110 and the moving rack 120.

As the pinion 101 is rotated over the static rack 110 and the moving rack 120, each pinion tooth engages with a corresponding tooth of the static rack and a corresponding tooth of the moving rack. The rotational motion of the pinion 101 is translated into linear motion of the moving rack 120 owing to the difference in the number of teeth per unit length between the static rack 110 and the moving rack 120.

The moving rack 120 is displaced linearly relative to the static rack 110 in the longitudinal direction, whilst the static rack 110 remains stationary (e.g. relative to the support housing). The moving rack 120 is displaced in the longitudinal direction in an opposite direction to the movement of the pinion 101.

The magnitude of displacement of the pinion 101 over the static rack 110 is (e.g. directly) proportional to the magnitude of displacement of the moving rack 120 relative to the static rack 110. The magnitude of displacement of the pinion 101 over the static rack 110 may be considered an input displacement, whilst the magnitude of displacement of the moving rack 120 relative to the static rack 110 may be considered an output displacement.

For example, when the first number of teeth is one hundred and two, and the second number of teeth is one hundred, the output displacement is fifty times less than the input displacement. That is, when the pinion 101 is displaced by a length of a hundred teeth, the moving rack 120 is displaced by a length of two teeth. In this case, the displacement reduction ratio of the input displacement to the output displacement is therefore 50:1.

FIG. 1C shows a side elevation view of the displacement reduction mechanism 100 (upside down compared to FIGS. 1A and 1B). The moving rack 120 is positioned behind the static rack 110. The alignment between the teeth of the static rack 110 and the teeth of the moving rack 120 is shown when the pinion 101 is situated at a distal end of the static rack 110 and the same distal end of the moving rack 120.

A point of engagement 102 is shown at the point where the pinion 101 contacts the static rack 110 and the moving rack 120. At the point of engagement 102, the teeth of the static rack and the teeth of the moving rack are aligned with each other.

Owing to the difference in the number of teeth per unit length between the static rack and the moving rack, the teeth of the static rack and the teeth of the moving rack are not necessarily aligned elsewhere (e.g. at points other than the point of engagement 102) along the lengths of the racks.

Considering an alternative perspective, for any fixed point along the static rack 110 and the moving rack 120, the alignment between the teeth of the static rack and the teeth of the moving rack continuously changes as the pinion is rotated over the static rack 110 and the moving rack 120. Stated differently, alignment between the teeth of the static rack and the teeth of the moving rack occurs for all points of engagement of the pinion 101 along the static rack 110 and the moving rack 120.

Figure 2:
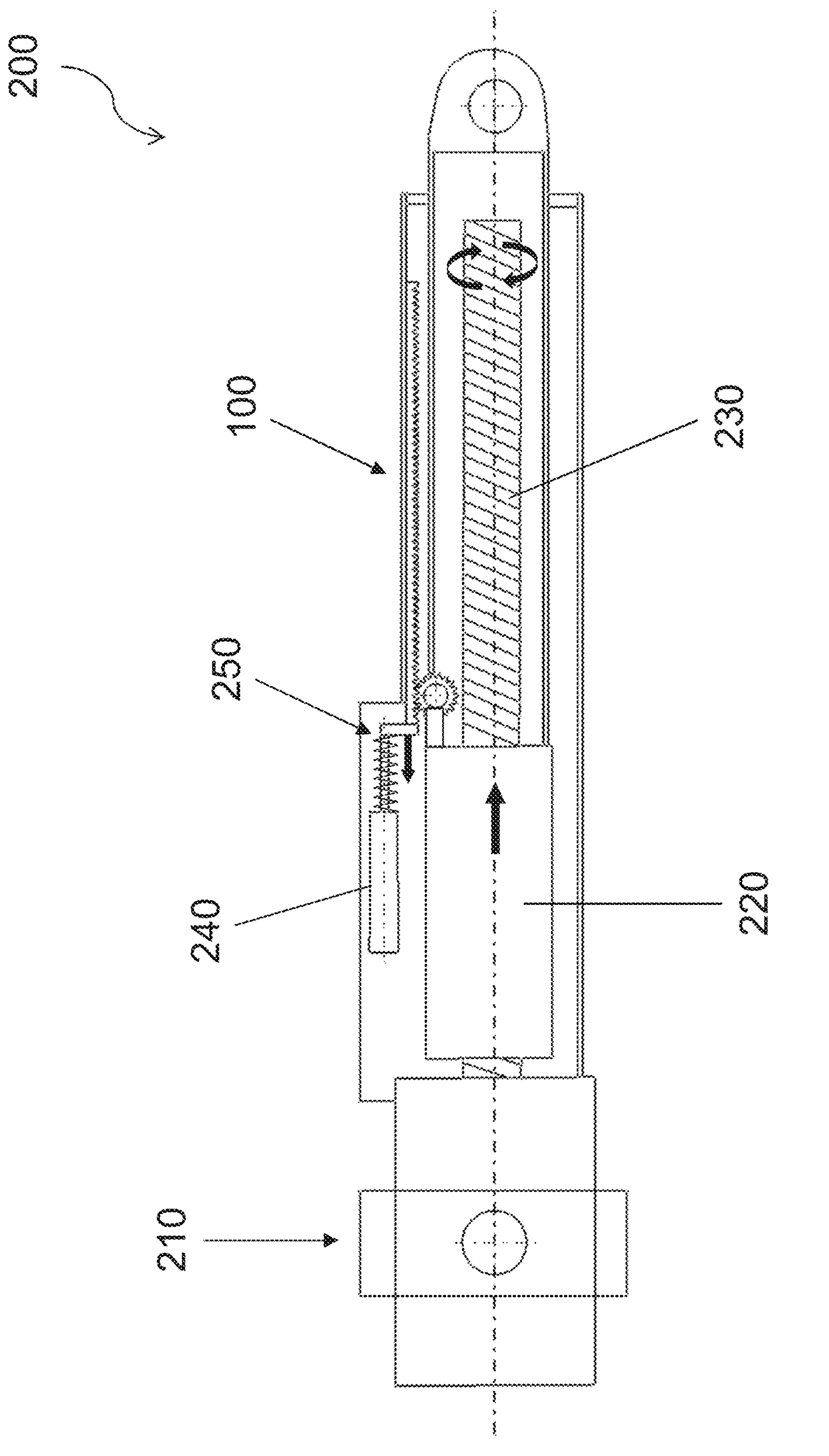
FIG. 2 shows a cross-sectional view of a system for monitoring the displacement of a linear actuator.

FIG. 2 shows a longitudinal cross-sectional view of a system 200 for monitoring the displacement of a linear actuator. The system 200 comprises the displacement reduction mechanism 100 as described in FIGS. 1A-C, a motor 210, a ball screw assembly comprising a ball nut 220 and a ball screw 230, a linear sensor 240 and a spring 250.

The motor 210 is (e.g. directly) coupled to the ball screw 230 of the ball screw assembly. The ball screw 230 of the ball screw assembly is (e.g. directly) coupled to a thrust reverser actuator (not shown). The motor 210 is configured to transmit rotational motion to the ball screw 230, which in turn is used to actuate the thrust reverser actuator.

The ball screw 230 comprises a ball screw shaft that extends linearly, parallel to the longitudinal direction of the displacement reduction mechanism. The ball screw shaft has a screw thread comprising helical grooves that extend along the ball screw shaft. The ball nut 220 comprises a central internal cavity to receive the ball screw shaft. The central internal cavity has a screw thread with complementary helical grooves to provide coupling to the ball screw shaft.

The ball screw 230 is fixed relative to the displacement reduction mechanism 100. The ball nut 220 is linearly moveable in the longitudinal direction. Therefore, as the ball screw 230 rotates, the ball nut 220 translates linearly along the length of the ball screw shaft.

The ball nut 220 is mechanically coupled to the input shaft 103 of the pinion 101. As the ball nut 220 translates linearly along the length of the ball screw shaft, it pushes the input shaft 103 relative to the static rack 110 and the moving rack 120, such that the pinion 101 rotates about the input shaft 103. The linear motion of the ball nut 220 along the ball screw shaft is thus translated into rotational motion of the pinion 101.

The magnitude of displacement of the moving rack relative to the static rack is (e.g. directly) proportional to the magnitude of displacement of the ball nut over the ball screw shaft. The displacement of the thrust reverser actuator, also known as a stroke, is equal to the displacement of the ball nut over the ball screw shaft. The magnitude of the displacement of the moving rack relative to the static rack is equally proportional to the magnitude of the displacement of the thrust reverser actuator. The maximum displacement of the thrust reverser actuator is known as the stroke length.

In the example where the first number of teeth of the static rack is a hundred and two and the second number of teeth of the moving rack is a hundred, the magnitude of displacement of the moving rack relative to the static rack is one fiftieth of the magnitude of displacement of the ball nut over the ball screw shaft.

The spring 250 may be provided between the moving rack 120 and the linear sensor 240 to help reduce (e.g. eliminate) backlash.

The moving rack 120 of the displacement reduction mechanism 100 is (e.g. directly) coupled to the linear sensor 240. The linear sensor 240 is arranged to receive the reduced output displacement from the displacement reduction mechanism 100. The linear sensor 240 is a linear variable differential transformer (LVDT), which comprises a primary coil and two secondary coils wound around a core. As the core moves axially along the LVDT, it induces a voltage in the secondary coils, which can be measured to determine the displacement.

Transmitting a reduced displacement to the linear sensor 240 enables a closed loop feedback control in the thrust reverser actuation system. Based on the reduced displacement received at the linear sensor 240 (which is representative of the thrust reverser displacement), a control action may be issued by a controller (not shown) coupled to the linear sensor 240 to adjust the position of the thrust reverser actuator, as necessary.

As the thrust reverser actuator moves between the stow strokes and deploy strokes, the system 200 is configured to monitor the displacement of the thrust reverser actuator by monitoring the reduced output displacement using the linear sensor 240.

Figure 3A:
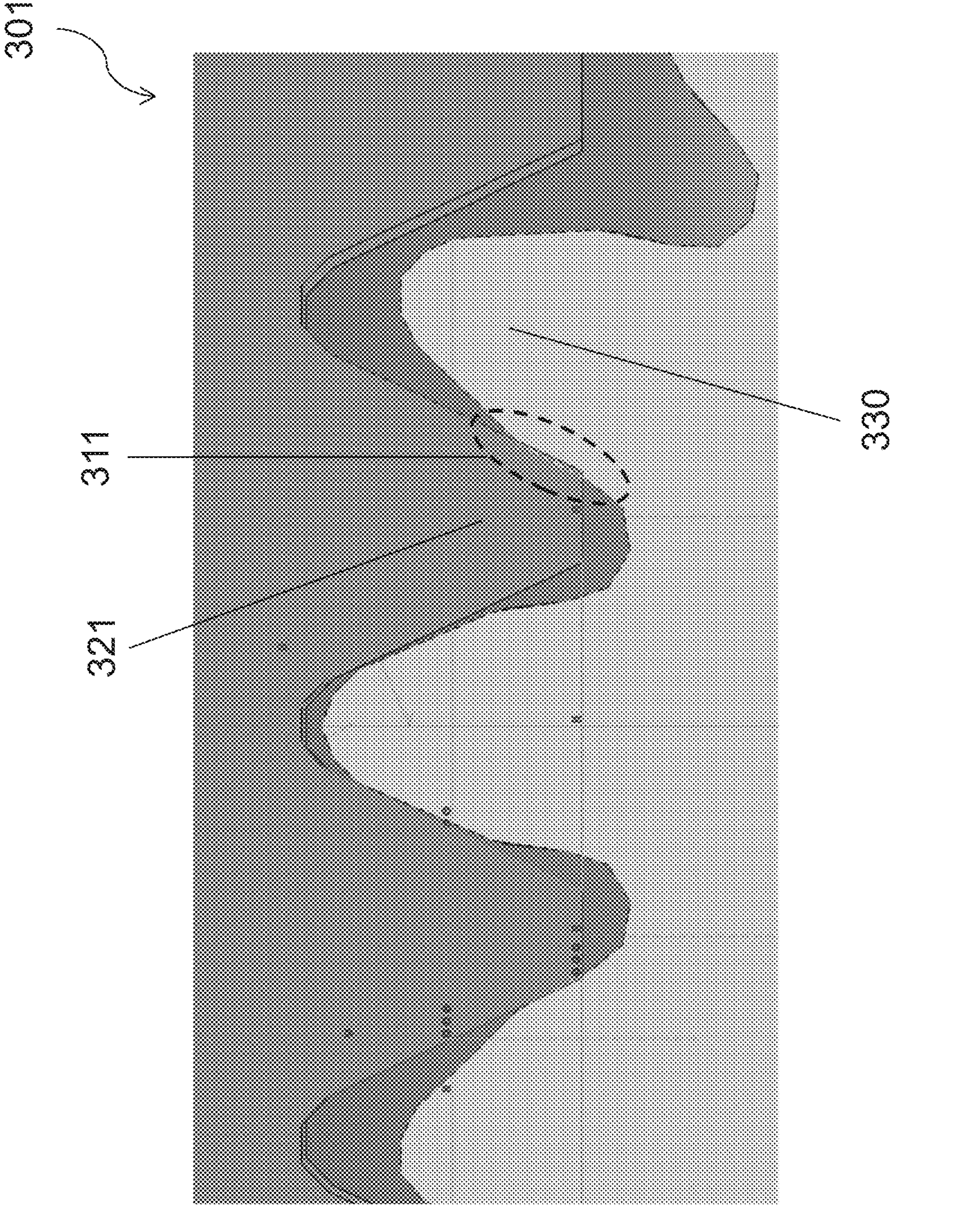
FIG. 3A shows a standard gear tooth profile.

FIG. 3A shows a tooth gear profile 301 of a rack (e.g. the static rack, as shown in FIGS. 1A, 1B and 1C) when it is engaged with a tooth of a pinion.

The tooth gear profile 301 has a point of contact 311 which shows a contact region between a tooth of the rack 321 and a tooth of the pinion 330, when the pinion meshes with a rack. The point of contact 311 is located at a tooth tip of the tooth of the rack.

The contact region may be present owing to a decreased number of teeth per unit length of a rack. For example, the moving rack 120 may be considered as having a number of teeth "removed" in comparison to the static rack 110.

Figure 3B:
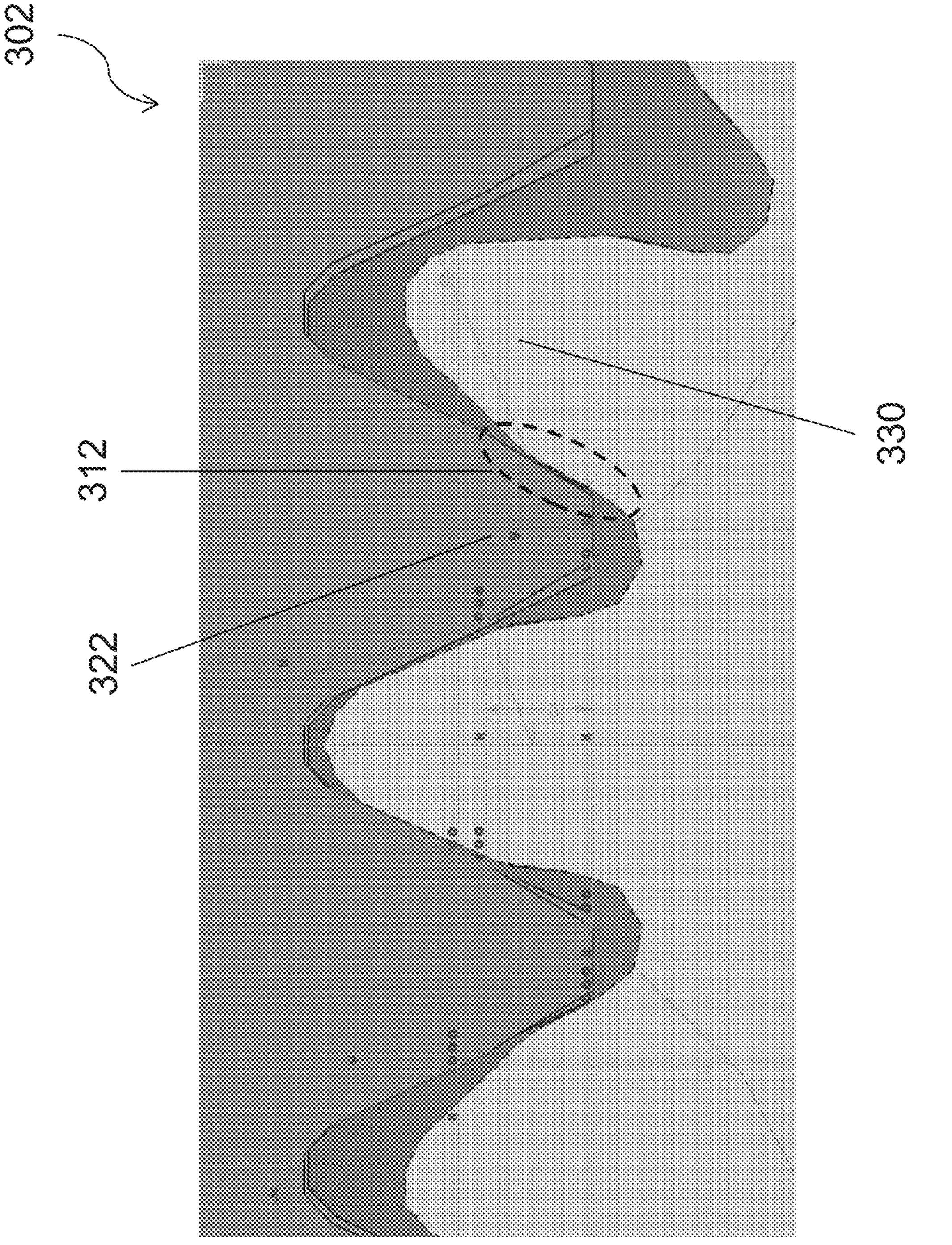
FIG. 3B shows a modified gear tooth profile.

FIG. 3B shows a modified tooth gear profile 302 of a rack (e.g. the moving rack, as shown in FIGS. 1A, 1B and 1C) when it is engaged with a tooth of a pinion.

The modified tooth gear profile 302 has a point of contact 312 shows a reduced tooth tip width region between a tooth of the rack 322 and a tooth of the pinion 330 when a pinion meshes with a rack. The point of contact 312 is located at a tooth tip of the tooth of the rack 322.

The reduced tooth tip width of the tooth of the rack 322 improves meshing of the pinion with the rack in spite of a decreased number of teeth per unit length.

The modified tooth gear profile 302 additionally or alternatively has a reduced tooth root width at the tooth of the pinion 330. The tooth root width may be reduced by increasing an undercut of the tooth of the pinion 330.

The reduced tooth root width of the tooth of the pinion 330 helps to create more clearance for improved meshing. Interference between the teeth of the pinion 330 and the tooth of the rack 322 may be reduced (e.g. minimised), and stress concentration may be reduced by distributing the forces acting on the tooth of the pinion more evenly.

The modified tooth gear profile 302 may be implemented on the teeth of the moving rack 120.

It will be appreciated by those skilled in the art that the disclosure has been illustrated by describing one or more specific examples thereof, but is not limited to these examples; many variations and modifications are possible, within the scope of the accompanying claims.

The invention claimed is:

1. A displacement reduction mechanism for coupling to a linear sensor, the displacement reduction mechanism comprising:

a pinion;

a first rack comprising a first plurality of teeth; and a second rack comprising a second plurality of teeth;

wherein the first rack and the second rack are parallel to each other;

wherein a first direction in which the first plurality of teeth protrudes from the first rack is the same as a second direction in which the second plurality of teeth protrudes from the second rack;

wherein the pinion is configured to be rotated over the first rack and the second rack such that the pinion engages simultaneously with the first plurality of teeth and the second plurality of teeth;

wherein a number of teeth per unit length of the first rack is different from a number of teeth per unit length of the second rack; and wherein the pinion, the first rack and the second rack are arranged such that the rotation of the pinion over the first rack and the second rack causes the second rack to be displaced relative to the first rack.

2. The displacement reduction mechanism of claim 1, wherein the pinion comprises an input shaft configured to be translated along the first rack and the second rack.

3. The displacement reduction mechanism of claim 1, wherein each tooth of the pinion is configured to extend over and engage with a corresponding tooth of the first rack and a corresponding tooth of the second rack.

4. The displacement reduction mechanism of claim 2, wherein the direction in which the second rack is displaced relative to the first rack is parallel to the direction in which the input shaft is translated.

5. The displacement reduction mechanism of claim 1, wherein the number of teeth per unit length of the second rack is smaller than the number of teeth per unit length of the first rack.

6. The displacement reduction mechanism of claim 1, wherein the fraction of the number of teeth per unit length of the second rack over the number of teeth per unit length of the first rack is greater than or equal to 4/5, e.g. greater than or equal to 9/10, greater than or equal to 19/20, greater than or equal to 49/50.

7. The displacement reduction mechanism of claim 1, wherein the pinion is configured to be rotated reciprocally over the first rack and the second rack.

8. The displacement reduction mechanism of claim 1, wherein the first plurality of teeth and the second plurality of teeth protrude outwardly from only one side of the first rack and only one side of the second rack respectively.

9. The displacement reduction mechanism of claim 1, wherein each of the first plurality of teeth comprises a first tooth tip width, wherein the second plurality of teeth comprises teeth having a second tooth profile, wherein the second tooth profile comprises a second tooth tip width which is narrower than the first tooth tip width.

10. A system for monitoring the displacement of a linear actuator, the system comprising:

the displacement reduction mechanism of claim 1;

a linear sensor;

an input actuator for translating the pinion across the first rack and the second rack;

wherein the pinion is configured to be coupled to the input actuator;

wherein the second rack is configured to be coupled to the linear sensor.

11. The system as claimed in claim 10, wherein the input actuator is arranged to be coupled to a thrust reverser actuator.

12. The system of claim 10, wherein the pinion is configured to be coupled or connected to the input actuator via a linear mechanical input.

13. The system of claim 10, wherein the linear sensor is configured to be communicatively coupled with an aircraft control system, and wherein the linear sensor is further configured to transmit a signal representative of the linear displacement to the aircraft control system.

14. The system of claim 10, wherein the system further comprises a spring connected between the second rack and the linear sensor.

15. The system of claim 10, wherein the linear sensor comprises a linear variable differential transformer.

* * * * *